US011053394B2

(12) United States Patent
Tao et al.

(10) Patent No.: US 11,053,394 B2
(45) Date of Patent: Jul. 6, 2021

(54) HYBRID POLYESTER-FLUOROCARBON POWDER COATING COMPOSITION AND A METHOD FOR COATING A SUBSTRATE WITH SUCH COMPOSITION

(71) Applicant: Akzo Nobel Coatings International B.V., Arnhem (NL)

(72) Inventors: Yanling Tao, Shanghai (CN); Xiaodong Wang, Shanghai (CN); Wei Jiang, Shanghai (CN)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 16/332,142

(22) PCT Filed: Sep. 14, 2017

(86) PCT No.: PCT/EP2017/073189
§ 371 (c)(1),
(2) Date: Mar. 11, 2019

(87) PCT Pub. No.: WO2018/050774
PCT Pub. Date: Mar. 22, 2018

(65) Prior Publication Data
US 2019/0367742 A1 Dec. 5, 2019

(30) Foreign Application Priority Data

Sep. 18, 2016 (WO) .................. PCT/C2016/099199
Oct. 26, 2016 (EP) ..................................... 16195847

(51) Int. Cl.
*C09D 5/03* (2006.01)
*C09D 127/12* (2006.01)
(Continued)

(52) U.S. Cl.
CPC ............. *C09D 5/03* (2013.01); *C09D 127/12* (2013.01); *C09D 167/00* (2013.01); *C09D 175/06* (2013.01)

(58) Field of Classification Search
CPC ....... C09D 127/12; C09D 175/06; C09D 5/03
See application file for complete search history.

(56) References Cited

U.S. PATENT DOCUMENTS 4,916,188 A  4/1990 Reising
6,491,973 B1 * 12/2002 Davydov ................. C08J 3/005
427/195

(Continued)

FOREIGN PATENT DOCUMENTS

CN   102666740 A   9/2012
CN   103154415 A   6/2013

(Continued)

OTHER PUBLICATIONS

CN102666740, Machine Translation, 2014. (Year: 2014).*

(Continued)

*Primary Examiner* — Robert A Vetere
(74) *Attorney, Agent, or Firm* — McDonnell Boehnen Hulbert & Berghoff LLP

(57) ABSTRACT

The present invention provides a hybrid polyester-fluorocarbon powder coating composition which is a dry blend of a polyester powder coating composition A and a fluorocarbon powder coating composition B, wherein: —polyester powder coating composition A comprises a first polyester polymer and a curing agent for the first polyester polymer; and —fluorocarbon powder coating composition B comprises a fluorocarbon polymer, a curing agent for the fluorocarbon polymer, and a second polyester polymer and a curing agent for the second polyester polymer; wherein the weight ratio of polyester powder coating composition A and fluorocarbon powder coating composition B is in the range (Continued)

of from 25:75 to 75:25, wherein the first polyester polymer is a carboxyl functional polymer having an acid value in the range from 18 to 70 mg KOH/g polymer and wherein the second polyester polymer is a hydroxyl functional polyester polymer having a hydroxyl value in the range of from 70 to 350 mg KOH/g polymer. The invention further provides to a method for coating a substrate with such hybrid polyester-fluorocarbon powder coating composition.

18 Claims, 1 Drawing Sheet

(51) Int. Cl.
*C09D 167/00* (2006.01)
*C09D 175/06* (2006.01)

(56) References Cited

U.S. PATENT DOCUMENTS

| | | |
|---|---|---|
| 6,864,316 B1 | 3/2005 | Iwakiri et al. |
| 9,206,320 B1 | 12/2015 | Daly et al. |
| 2002/0169234 A1 | 11/2002 | Ring et al. |
| 2004/0143073 A1* | 7/2004 | Bejko ............... C09D 167/00 525/418 |
| 2013/0196062 A1* | 8/2013 | Wang ................. C08G 18/8074 427/201 |

FOREIGN PATENT DOCUMENTS

| | | | |
|---|---|---|---|
| CN | 103194140 A | 7/2013 | |
| CN | 102666740 B | * 7/2014 | ............... C09D 5/03 |
| CN | 104334660 A | 2/2015 | |
| CN | 104520395 A | 4/2015 | |
| CN | 105452400 A | 3/2016 | |
| EP | 2 868 724 A1 | 5/2015 | |
| EP | 3 029 117 A1 | 6/2016 | |
| JP | 2011-011117 A | 1/2011 | |
| JP | 2013-076019 A | 4/2013 | |
| JP | 2013076019 A | 4/2013 | |
| TW | 572978 B | 1/2004 | |
| TW | I532799 B | 5/2016 | |
| WO | 2012/048650 A1 | 4/2012 | |

OTHER PUBLICATIONS

Translated Search Report issued in Taiwanese Application No. 167975 dated Dec. 29, 2020, 1 page.
Kiguchi et al., DNT Technical Report on Coatings, No. 11, 2011, p. 8-18 (ISSN 1346-83-67).

* cited by examiner

HYBRID POLYESTER-FLUOROCARBON POWDER COATING COMPOSITION AND A METHOD FOR COATING A SUBSTRATE WITH SUCH COMPOSITION

This application is the U.S. national phase under 35 U.S.C. § 371 of international application PCT/EP2017/073189, filed Sep. 14, 2017, which claims priority to International Application CN2016/099199, filed Sep. 18, 2016 and European Application 16195847.5, filed Oct. 26, 2016.

FIELD OF THE INVENTION

This invention relates to a hybrid polyester-fluorocarbon powder coating composition which is a dry blend of a polyester powder coating composition A and a fluorocarbon powder coating composition B and to a method for coating a substrate with such hybrid polyester-fluorocarbon powder coating composition.

BACKGROUND OF THE INVENTION

Powder coating compositions are solid compositions that generally comprise a solid film-forming or binder polymer or mixtures of different solid film-forming polymers, usually with one or more pigments and, optionally, one or more performance additives such as plasticizers, stabilizers, flow aids and extenders. The film-forming polymers are usually thermosetting polymers that cure upon heating, typically in the presence of a corresponding crosslinking agent, which may itself be a polymer. Generally, the polymers have a glass transition temperature (Tg), softening point or melting point above 30° C.

Conventionally, the manufacture of a powder coating compositions comprises melt-mixing the components of the composition. Melt-mixing involves the high speed, high intensity mixing of dry ingredients followed by heating of the mixture to an elevated temperature—above the softening temperature of the uncured polymer but below the curing temperature—in a continuous compounder to form a molten mixture. The compounder preferably comprises a single or twin screw extruder as these serve to improve the dispersion of the other ingredients in the polymer as the polymer melts. The molten mixture is extruded, typically rolled in the form of a sheet, cooled to solidify the mixture and subsequently crushed to flakes and subsequently pulverized to a fine powder.

Such processing is then generally followed by a sequence of particle sizing and separation operations—such as grinding, classifying, sifting, screening, cyclone separation, sieving and filtering—that precede the application of the powder to a substrate and the heating of that powder to melt and fuse the particles and to cure the coating. The main methods by which powder coatings are applied include fluidized-bed processes, wherein a substrate is preheated and dipped in a fluidized bed of the powder resulting in the powder fusing on contact with hot surface and adhering to the substrate, and electrostatic fluidized-bed processes and electrostatic spray processes in which the powder coating particles are electrostatically charged by electrodes within a fluidized bed or by an electrostatic spray gun and directed to be deposited onto an earthed substrate.

Powder coating compositions that comprise both a fluorocarbon polymer and a polyester polymer are known in the art. In U.S. Pat. No. 4,916,188 is disclosed a hybrid fluorocarbon powder coating comprising a hydroxyl-functional fluorocarbon resin, a blocked di-isocyanate crosslinker, and a hydroxyl-functional acrylic or polyester polymer. The examples show that the hybrid system has inferior gloss retention in comparison to a fluorocarbon powder coating that does not contain a hydroxyl-functional acrylic or polyester polymer. The powder coating compositions are prepared by blending the individual components, followed by melt-mixing of this blend in a high intensity mixer, followed by extruding the molten mixture from a heated extruder.

In U.S. Pat. No. 6,864,316 is disclosed a hybrid fluorocarbon powder coating composition comprising a specific fluorocarbon polymer with vinyl versatate or vinyl benzoate units, a polyester polymer, and a blocked di-isocyanate crosslinker. Also in U.S. Pat. No. 6,864,316 the powder coating compositions are prepared by blending the individual components, followed by melt-mixing of this blend in a high intensity mixer, followed by extruding the molten mixture from a heated extruder.

In WO 2012/048650 is disclosed a hybrid polyester-fluorocarbon powder coating composition that is obtained by dry blending a polyester powder coating composition and a fluorocarbon powder coating composition. The dry-blended hybrid powder coating composition of WO 2012/048650 shows improved gloss retention and weathering resistance compared to similar hybrid powder coating compositions prepared by melt-mixing the blend of polyester polymer, fluorocarbon polymer and curing agent.

It is known that powder coating compositions that comprise both a fluorocarbon polymer and a polyester polymer may result in a separated layer structure of the resulting coating, with a fluorocarbon layer on top of a polyester layer. In a paper by T. Kiguchi T., and Y. Ando, *DNT Technical Report on Coatings*, No. 11, 2011, p. 8-18 (ISSN 1346-83-67), layer separation of hybrid polyester-fluorocarbon powder coatings is studied.

For many applications, a good separation of the fluorocarbon layer and the polyester layer in coatings formed from hybrid polyester-fluorocarbon powder coating compositions is desired. If the layers separate, optimum use can be made of the good substrate adhesion of the polyester and of the good weather-resistance and durability of the fluorocarbon layer. In particular in coatings wherein the bottom polyester layer comprises components that are sensitive to oxidation, UV or weathering, such as for example metallic pigments, a good layer separation or stratification in combination with good weatherability is highly desired.

SUMMARY OF THE INVENTION

It has now been found that very good layer separation in combination with very good weatherability is achieved with a dry-blended hybrid polyester-fluorocarbon powder coating composition, if a carboxyl-functional polyester polymer is used in the polyester powder coating composition and a hydroxyl-functional polyester polymer with a relatively high OH-value is used combined with the fluorocarbon polymer in the fluorocarbon powder coating composition.

Accordingly, the invention provides a hybrid polyester-fluorocarbon powder coating composition which is a dry blend of a polyester powder coating composition A and a fluorocarbon powder coating composition B, wherein:
  polyester powder coating composition A comprises a first polyester polymer and a curing agent for the first polyester polymer; and
  fluorocarbon powder coating composition B comprises a fluorocarbon polymer, a curing agent for the fluorocarbon polymer, and a second polyester polymer and a curing agent for the second polyester polymer;

wherein the weight ratio of polyester powder coating composition A and fluorocarbon powder coating composition B is in the range of from 25:75 to 75:25,
wherein the first polyester polymer is a carboxyl functional polyester polymer having an acid value in the range from 18 to 70 mg KOH/g polymer and wherein the second polyester polymer is a hydroxyl functional polyester polymer having a hydroxyl value in the range of from 70 to 350 mg KOH/g polymer.

An important advantage of the hybrid powder polyester-fluorocarbon powder coating composition according to the invention is that a structure with two separate layers is obtained, with an evenly spread fluorocarbon top layer protecting the bottom polyester layer. For hybrid polyester-fluorocarbon powder coating compositions with components bonded to polyester powder coating composition A that give a visual effect to the resulting coating, e.g. pigments providing a metallic effect, such visual effect is better protected against degradation. The hybrid polyester-fluorocarbon powder coating composition of the present invention can be used to provide surfaces with a weather-resistant coating that has good UV-resistance and gloss retention, even after prolonged exposure to harsh weather conditions. In particular, the composition according to the present invention may be used to form a coating with a metallic visual effect that is stable even after exposure to severe weather conditions.

In a further aspect, the invention therefore relates to a method for coating a substrate comprising providing a substrate, applying a hybrid powder coating composition as hereinbefore defined on the substrate, and curing the hybrid powder coating composition applied on the substrate to obtain a coated substrate.

DETAILED DESCRIPTION OF THE INVENTION

Figure 1:
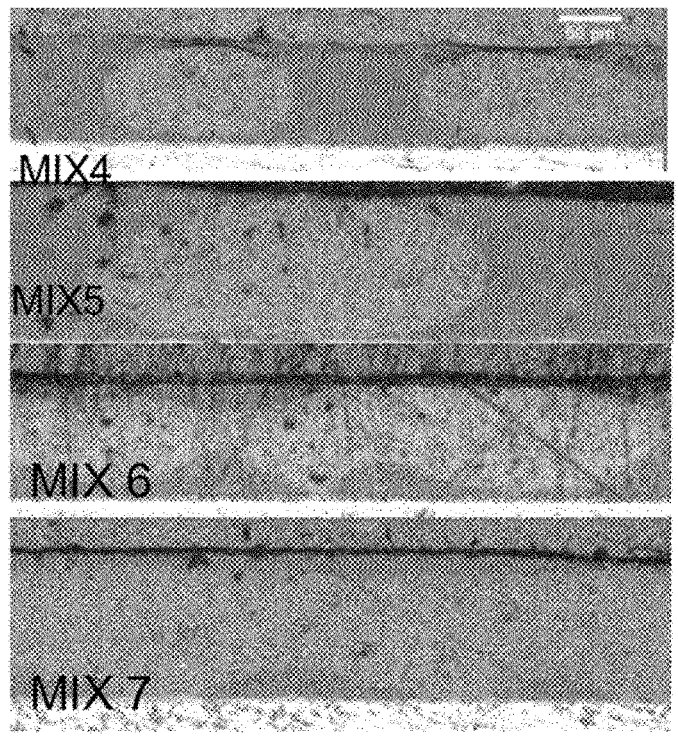
FIG. 1 shows cross-sectional views under an optical microscope of cured coatings of four different hybrid powder coating compositions not according to the invention.

The hybrid polyester-fluorocarbon powder coating composition according to the invention is a dry blend of a polyester powder coating composition A and a fluorocarbon powder coating composition B. The hybrid being a dry blend implies that the hybrid composition comprises discrete particles of polyester powder coating composition A and discrete particles of fluorocarbon powder coating composition B. The weight ratio of polyester powder coating composition A and fluorocarbon powder coating composition B in the hybrid composition is in the range of from 25:75 to 75:25, preferably of from 30:70 to 70:50, more preferably of from 35:65 to 65:35.

Preferably, the hybrid composition is free of any components other than polyester powder coating composition A and fluorocarbon powder coating composition B.

Polyester powder coating composition A comprises a first polyester polymer and a curing agent for the first polyester polymer. The first polyester polymer is a thermosetting polymer with carboxyl groups as cross-linking functionality.

The first polyester polymer is a carboxyl-functional polyester polymer having an acid value in the range from 18 to 70 mg KOH/g polymer, preferably of from 20 to 55 mg KOH/g polymer. The first polyester polymer preferably has a hydroxyl value below 15 mg KOH/g polymer, more preferably below 10 mg KOH/g polymer, even more preferably in the range from about 1 to 8 mg KOH/g polymer, still more preferably of from 1 to 2 mg KOH/g polymer. Examples of commercially available carboxyl functional polyesters that may suitably be used as the first polyester polymer include Crylcoat® 4488-0, Uralac® P5500, and Uralac® P883.

The first polyester polymer is a solid at ambient temperatures and has a softening point or Tg above 30° C., preferably above 45° C., more preferably in the range of from 48° C. to 70° C.

The curing agent is a curing agent adapted to cross-link the first polyester, i.e. an agent capable to cross-link carboxyl groups, preferably a glycidyl isocyanurate such as triglycidylisocyanurate, or a beta-hydroxy alkyl amide.

Preferably, powder coating composition A comprises at least 25 wt %, more preferably at least 30 wt %, even more preferably at least 50 wt % of the first polyester polymer. Composition A may comprise the curing agent for the first polyester polymer in any amount suitable for cross-linking the carboxyl groups. Preferably, the total amount of first polyester polymer and curing agent for the first polyester polymer in polyester powder coating composition A is in the range of from 60 to 95 wt %, more preferably of from 70 to 90 wt %, based on the weight of polyester powder coating composition A.

Polyester powder coating composition A preferably does not comprise a fluorocarbon polymer. More preferably, polyester powder coating composition A is essentially free of any film-forming polymer other than the first polyester polymer. It is noted that the curing agent, which can be a polymer in itself, is not considered to be a film-forming polymer.

Fluorocarbon powder coating composition B comprises a fluorocarbon polymer, a curing agent for the fluorocarbon polymer, and a second polyester polymer and a curing agent for the second polyester polymer.

The fluorocarbon polymer is a thermosetting, hydroxyl-functional film-forming polymer. Such fluorocarbon polymers are known in the art. Such fluorocarbon polymers typically comprise co-polymerized ethylenically unsaturated monomers containing carbon-to-carbon double bond unsaturation including minor amounts of hydroxylated vinyl monomers and major amounts of fluorocarbon monomers. An example of a commercial available suitable fluorocarbon polymer polymer is Lumiflon LF710.

Preferred thermosetting fluorocarbon polymers are copolymers of a hydroxyalkyl vinyl ether and a fluoro-olefin, or terpolymers of alkyl vinyl ether, hydroxalkyl vinyl ether, and a fluoroalkylene. Copolymer chains are believed to be a copolymer of alternating units of trifluoroethylene and vinyl ether with pendant side chain structures containing hydroxyl functionality due to the hydroxyalkyl vinyl ethers. Preferred fluorocarbon copolymers or terpolymers comprise in the range of from 30 to 70 mole % fluoro-olefin and in the range of from 30 to 70 mole % vinyl ether units, including hydroxyalkyl vinyl ether units. Preferred fluoro-olefins include tetrafluoroethylene, trifluoroethylene and chlorotrifluoroethylene. Preferred alkyl vinyl ethers include linear or branched chain aliphatic alkyls having from 2 to 8 carbon atoms such as methyl vinyl ether, ethyl vinyl ether, isopropyl vinyl ether, n-butyl vinyl ether, and similar lower alkyl vinyl ethers. Hydroxyalkyl vinyl ethers are similar alkyl vinyl ethers containing a substituted hydroxyl group on the alkyl chain. Preferably, the hydroxyl functional fluorocarbon polymer comprises in the range of from 1 to 30 mole % hydroxy alkyl vinyl ether units, more preferably of from 2 to 5 mole %. The hydroxyl value of the hydroxyl-functional fluorocarbon polymer is between 2 and 200 mg KOH/g polymer, preferably between 5 and 150 mg KOH/g polymer. Particularly preferred hydroxyl fluorocarbons are terpolymers of alkyl vinyl ether, hydroxyalkyl ether, and trifluoroethylene copolymer, commercially available as Lumiflon polymers.

Particularly preferred hydroxyl functional fluorocarbon polymers contain copolymerized monomeric units comprising in the range of from 45 to 48 mole % fluorocarbon monomer, in the range of from 2 to 5 mole % hydroxy alkyl vinyl ether monomer, with the balance being alkyl vinyl ether monomer.

The hydroxyl functional fluorocarbon polymer is a solid at ambient temperatures and has a softening point or Tg above 30° C., preferably in the range of from 35° C. to 50° C., a number average molecular weight between 8,000 and 16,000, preferably between 10,000 and 14,000, as measured by GPC (gel permeation chromatography) according to ASTM D 3016-78, D 3536-76, and D 3593-80.

Fluorocarbon powder coating composition B comprises a curing agent for the fluorocarbon polymer. Such curing agent is a curing agent adapted to cross-link the hydroxyl groups on the fluorocarbon polymer. Preferably, the curing agent is a blocked or non-blocked di-isocyanate based compound.

Preferably, fluorocarbon powder coating composition B comprises at least 25 wt %, more preferably at least 30 wt % of the fluorocarbon polymer, even more preferably at least 40 wt %. Composition B may comprise the curing agent for the fluorocarbon polymer in any amount suitable for crosslinking the hydroxyl groups on the fluorocarbon polymer. In addition to the fluorocarbon polymer and the curing agent for the fluorocarbon polymer, fluorocarbon powder coating composition B comprises a second polyester polymer and a curing agent for the second polyester polymer. Since the second polyester polymer is not the same as the first polyester polymer, the curing agent for the second polyester polymer is preferably not the same as the curing agent for the first polyester polymer.

Preferably the weight ratio between the fluorocarbon polymer and the second polyester polymer is in the range of from 0.5:1 to 4:1, more preferably of from 1:1 to 3:1.

Preferably, fluorocarbon powder coating composition B is essentially free of any film-forming polymer other than the fluorocarbon polymer and the second polyester polymer.

Reference herein to 'a composition being essentially free of a compound' is to the composition comprising such compound in an amount below 0.5 wt %, preferably below 0.1 wt %, even more preferably below 0.01 wt % or the composition being free of such component.

The second polyester polymer is a hydroxyl functional having a hydroxyl value in the range of from 70 to 350 mg KOH/g polymer, preferably in the range of from 75 to 150 mg KOH/g polymer. This hydroxyl functional polyester polymer preferably has an acid value below 15 mg KOH/g polymer, more preferably below 10 mg KOH/g polymer, even more preferably in the range from about 1 to 8 mg KOH/g polymer, still more preferably of from 1 to 2 mg KOH/g polymer. Examples of commercially available hydroxyl functional polyester polymers having a hydroxyl value in the range of from 70 to 350 mg KOH/g polymer include Uralac® P1580, Crylcoat® 2818-0, Crylcoat® 4823-0 and Crylcoat® 2814-0.

Fluorocarbon powder coating composition B preferably comprises a single curing agent which is capable of curing the hydroxyl functional fluorocarbon polymer and the hydroxyl functional second polyester polymer. Such single curing agent preferably is a non-blocked or a blocked di-isocyanate based compound.

Non-blocked and blocked di-isocyanate based compounds suitable as curing agents for hydroxyl functional polymers are well-known in the art and include, but are not limited to, non-blocked and blocked monomers, oligomers or polymers of isophorone di-isocyanate, 2,4-tolylene di-isocyanate, 2,6-tolylene di-isocyanate, alkylene di-isocyanates such as 1,4-tetramethylene-diisocyanate, 1,6-hexamethylene di-isocyanate, alkyl di-isocyanates such as 1,12-dodecane di-isocyanate, 1,3- and 1,4-cyclobutane di-isocyanate, 1,3- and 1,4-cyclohexane di-isocyanate, phenylene di-isocyanates and naphthalene-1,5-diisocyanate. Preferably, the free isocyanate functional groups in the di-isocyanate based compounds are blocked in a manner that they become unblocked and activated under heat at temperatures approximately above the melt temperature of the film-forming polymer(s) in the powder coating. The compounds may be blocked by using suitable blocking agents. Such blocking agents are well-known in the art and include alcohols, phenols, and ketoximes. Preferred blocking agents are 2-ethylhexyl alcohol and caprolactam. Alternatively, the di-isocyanate based curing agent may be internally blocked by dimerization of two free isocyanate groups, resulting in an urethdione structure.

Particularly preferred di-isocyanate based curing agents include caprolactam-blocked di-isocyanate based compounds or an urethdione of an isophorone di-isocyanate based compound.

Apart from the film-forming polymer(s) and curing agent(s) for such polymer(s), each of polyester powder coating composition A and fluorocarbon powder coating composition B may contain other components that are conventionally used in powder coatings compositions. Such components include pigments, fillers, flow control agents, degassing agents, and anti-blocking agents. Further additives including adhesion promoters, light stabilizers, gloss-modifying agents, cratering agents, texturizers, surfactants, antioxidants, biocides, and plasticizers may be used. Such compounds and additives may be used in usual amounts.

Each of polyester powder coating composition A and fluorocarbon powder coating composition B can be made in a melt-mixing process known to those skilled in the art. The hybrid powder coating composition according to the present invention is obtained by dry blending polyester powder coating composition A and fluorocarbon powder coating composition B. Such dry blending of composition A and composition B can be done in any suitable apparatus known to those skilled in the art, for example by using a ball mill or a high speed agitator. This dry-blended mixture of composition A and composition B will contain discrete particles of polyester powder coating composition A and discrete particles of fluorocarbon powder coating composition B.

According to a preferred embodiment of the present invention, polyester powder coating composition A further comprises in the range of from 0.1 to 15 wt % pigment providing a metallic effect, based on the weight of powder coating composition A. The pigment providing a metallic effect is bonded to polyester powder coating composition A, i.e. bonded to the discrete particles making up composition A. By bonding the pigment providing a metallic effect to the powder coating particles of composition A, the pigment is are evenly distributed within powder coating composition A. Bonding of solid pigment to a powder coating composition is known in the art and is typically done by:

- heating the powder coating composition to a heating temperature around the glass transition temperature but below the curing temperature of any binder polymer in the powder coating composition, under an inert atmosphere;
- adding the solid pigment to the heated powder coating composition under stirring whilst maintaining the heating temperature until the solid pigment is bonded to the powder coating particles, typically 10-20 minutes; and
- cooling the powder coating composition.

Preferably, the hybrid composition comprises in the range of from 0.5 to 10 wt % pigment providing a metallic effect based on the weight of powder coating composition A.

Reference herein to pigment providing a metallic effect is to solid pigments, preferably metallic pigments, typically in flake form such as for example aluminum or an aluminum alloy or another metal or metal alloy, for example stainless steel, copper, tin, bronze or brass, typically used to produce various metallic effects including those referred to as "metallic", "effect", "luster", or "glamour" or "pearlescent" effect. The pigment providing a metallic effect may be a non-metal compound such as for example mica, that gives such metallic effect.

The pigment providing a metallic effect may be an uncoated or coated material. Examples of coated material include pigments coated with silica or other inert inorganic material for increasing chemical resistance and durability. Alternatively, the pigment may be coated with a plastic material for similar purposes, for example an acrylic, PFTE, or thermosetting plastic material, or may be provided in a polymer or plasticizer which is compatible with the film-forming binder of the powder coating composition. As a further possibility the pigment providing a metallic effect may be coated with a coloring agent such as a metal oxide pigment, e.g. iron oxide, to provide special color effects.

Pigments providing a metallic effect are well-known and commercially available. Suitable examples of commercially available pigments with metallic effect include Standart PU Aluminium Powder (ex. Eckart), and SILBERCOTE PC X (ex. Silberline).

Such pigments are typically in the form of flakes, powder or granules, preferably flakes, with an average particle size (D50) in the range of from 10 to 100 µm, preferably in the range of from 15 to 50 µm. Particularly preferred pigments providing a metallic effect are coated or uncoated aluminium flakes with an average particle size (D50) in the range of from 10 to 100 µm, preferably in the range of from 15 to 50 µm.

In another aspect, the invention provides a method for coating a substrate comprising providing a substrate, applying a hybrid polyester-fluorocarbon powder coating composition according to the invention on the substrate, and curing the hybrid powder coating composition applied on the substrate to obtain a coated substrate.

The substrate may be any substrate suitable for powder coating, preferably a metal substrate, more preferably an aluminium substrate. Prior to applying the hybrid polyester-fluorocarbon powder coating composition according to the invention, the substrate surface may be treated by a surface treatment to remove any contaminants and/or to improve corrosion resistance of the substrate. Such surface treatments are well known in the art and commonly applied to surfaces to be coated with powder coatings.

EXAMPLES

The invention will be further illustrated by means of the following, non-limiting examples.

Example 1

Polyester Powder Coating Compositions A

Seven different polyester powder coating compositions with a film-forming polyester polymer and a curing agent for the polyester were prepared. In Table 1, the ingredients used in the different polyester powder coating compositions are given. The hydroxyl functional polyesters polymers used in polyester powder coating composition A1, A2, and A3 were CRYLCOAT® 4823-0, 2818-0, and 2814-0 (ex. Allnex), respectively.

TABLE 1

| Polyester powder coating compositions A | | | | | | | |
|---|---|---|---|---|---|---|---|
| | A1 | A2 | A3 | A4 | A5 | A6 | A7 |
| OH-value (mg KOH/g polyester) | 80 | 100 | 330 | | | | |
| acid value (mg KOH/g polyester) | <10 | <3 | <14 | 22 | 36 | 36 | 58 |
| polyester (wt %) | 57.6 | 54.4 | 32 | 77.2 | 76 | 75 | 73.6 |
| Curing agent | | | | | | | |
| Vestagon B 1530$^a$ (wt %) | 22.4 | 25.6 | 48 | | | | |
| Primid XL522 (ß-hydroxyalkylamide) (wt %) | | | | 2.8 | 4 | | 6.3 |
| 1,3,5-triglycidyl isocyanurate (wt %) | | | | | | 5 | |
| Benzion (wt %) | 0.5 | 0.5 | 0.5 | 0.5 | 0.5 | 0.5 | 0.5 |
| Flowing agent (wt %) | 1.0 | 1.0 | 1.0 | 1.0 | 1.0 | 1.0 | 1.0 |
| TiO$_2$ and filler (BaSO$_4$) (wt %) | 18.5 | 18.5 | 18.5 | 18.5 | 18.5 | 18.5 | 18.5 |
| Aluminium pigment$^b$ (wt %) | 5 | 5 | 5 | 5 | 5 | 5 | 5 |

$^a$caprolactam-blocked poly-isocyanate
$^b$Standart PCU 3500 Aluminium Powder (ex. Eckart)

All ingredients, except the pigment particles providing a metallic effect (aluminum pigment) were first dry mixed and then melt-mixed in a ZSK-26 twin extruder, micronized and sieved with a 200 mesh sieve to obtain a non-metallic polyester powder coating composition. This non-metallic polyester powder coating composition was added into a CM-3 bonding machine, and heated to the glass transition temperature of the polyester binder under nitrogen atmosphere. The aluminum pigment was added into the bonding machine maintaining the temperature at the glass transition temperature during 20 minutes, followed by cooling to ambient temperature.

Fluorocarbon Powder Coating Compositions B

Two different fluorocarbon powder coating compositions with a film-forming fluorocarbon polymer and a curing agent for the fluorocarbon polymer were prepared in a process as described for polyester powder coating compositions A. Composition B1 comprises fluorocarbon polymer as the only film-forming polymer. B2 comprises fluorocarbon polymer and a hydroxyl functional polyester as film-forming polymers. In Table 2, the ingredients used in the different fluorocarbon powder coating compositions are given.

TABLE 2

Fluorocarbon powder coating compositions B

|  | B1 | B2 |
|---|---|---|
| Fluorocarbon polymer (Lumiflon 710) | 79 | 47 |
| Polyester* |  | 27 |
| Curing agent | 18 | 22 |
| Benzoin | 0.3 | 0.3 |
| Flowing agent | 1.0 | 1.0 |
| Anti-oxidant agent | 0.2 | 0.2 |
| Wax additive | 2.5 | 2.5 |

*CRYLCOAT ® 4823-0; OH-value is 80 mg KOH/g polyester

Hybrid Polyester-Fluorocarbon Powder Coating Compositions

Hybrid polyester-fluorocarbon powder coating compositions were prepared by mixing one of the polyester powder coating compositions A with one of the fluorocarbon powder coating compositions B in a 50/50 weight ratio in a mixing set-up for powder coating materials at room temperature for 2-10 minutes. Different hybrid polyester-fluorocarbon powder coating compositions were prepared as indicated in Table 3.

TABLE 3

Hybrid polyester-fluorocarbon powder coating compositions prepared

| Hybrid | Polyester powder coating composition A | Fluorocarbon powder coating composition B |
|---|---|---|
| MIX 1 (comparison) | A1 | B1 |
| MIX 2 (comparison) | A2 | B1 |
| MIX 3 (comparison) | A3 | B1 |
| MIX 4 (comparison) | A4 | B1 |
| MIX 5 (comparison) | A5 | B1 |
| MIX 6 (comparison) | A6 | B1 |
| MIX 7 (comparison) | A7 | B1 |
| MIX 8 (invention) | A4 | B2 |
| MIX 9 (invention) | A5 | B2 |
| MIX 10 (comparison) | A6 | B1 |
| MIX 11 (comparison) | A7 | B1 |

Microscopic Evaluation of Coatings

The hybrid polyester-fluorocarbon powder coating compositions were sprayed onto an aluminium panel, pretreated with a non-chromate surface pretreatment, with a Corona spray gun, at a spray voltage of 60-80 kV. The distance from gun to substrate was 20 to 25 cm, and the air flow was adjusted to achieve a 50 to 70 μm paint film thickness. The panels coated with powder coating composition were baked in an oven at 200° C. for 10-30 minutes, to allow the powder coating to melt, flow, and cure.

In FIG. 1 is shown cross-sectional views under an optical microscope, which show the phase separation in cured coatings of hybrid polyester-fluorocarbon powder coating compositions: MIX 4, MIX 5, MIX 6 and MIX 7, prepared by dry-blending a polyester powder coating composition A with a carboxyl functional polyester polymer (A4, A5, A6, and A7, respectively) with a fluorocarbon powder composition B with fluorocarbon polymer as the only film-forming polymer (B1).

Figure 2:
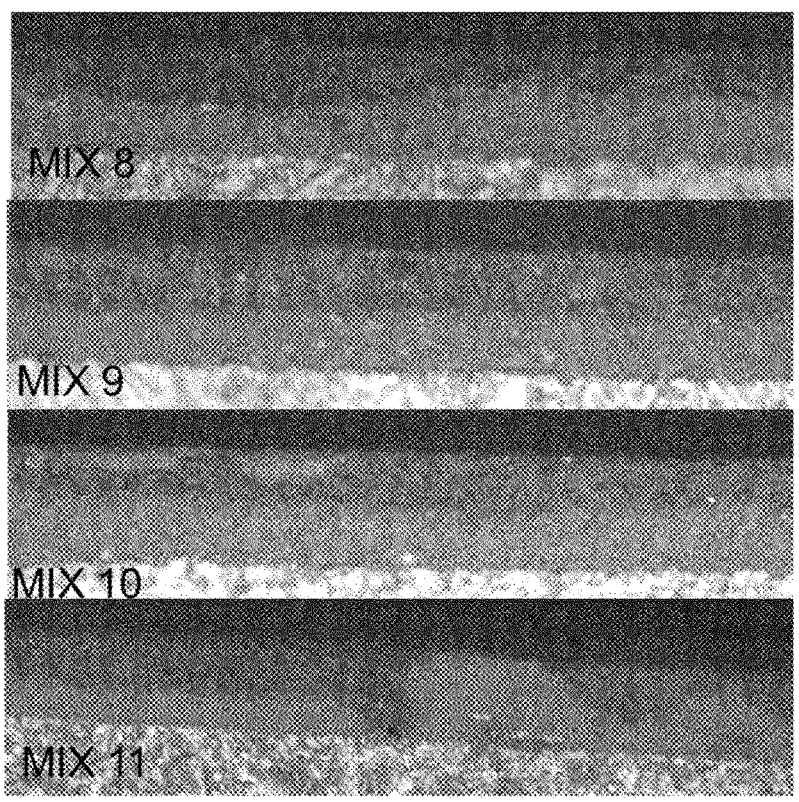
FIG. 2 shows cross-sectional views under an optical microscope of cured coatings of two different hybrid powder coating compositions according to the invention (MIX 8 and MIX 9) and of two different hybrid powder coating compositions not according to the invention (MIX 10 and MIX 11).

In FIG. 2 is shown cross-sectional views under an optical microscope, which show the actual phase separation in cured coatings of hybrid polyester-fluorocarbon powder coating compositions according to the invention MIX 8 and MIX 9, and in cured coatings of hybrid polyester-fluorocarbon powder coating compositions not according to the invention, MIX 10 and MIX 11 (which have the same composition as MIX 6 and MIX 7). MIX 8 and MIX 9 are prepared by dry-blending a polyester powder coating composition A with a carboxyl functional polyester polymer (A4 and A5, respectively) with a fluorocarbon powder composition B with a fluorocarbon polymer and a hydroxyl functional polyester polymer with a high hydroxyl value (B2).

It can be seen in FIGS. 1 and 2 that the coatings made with comparative hybrid powder coating compositions MIX 4, MIX 5, MIX 6, MIX 7, MIX 10 and MIX 11 do not show good phase separation. The use of a carboxylic polyester polymer in powder coating composition A in combination with a hydroxyl functional polyester polymer (with a hydroxyl value of at least 70 mg KOH/g polyester) in powder coating composition B results in good phase separation (MIX 8 and MIX 9).

Example 2

The gloss of aluminium substrates coated with hybrid powder coating compositions according to the invention MIX 8 and MIX 9, polyester powder coating compositions A1-A7, and comparative hybrid powder coating compositions MIX 1-3 and MIX 10 and MIX 11 (all coated as described in Example 1), was determined in accordance with ISO2813. Gloss was determined directly after manufacture (t=0; initial gloss). The coated substrates were then exposed to intense light from a Xenon lamp. The gloss was measured at certain time intervals. In Tables 4 and 5, the gloss retention is given for the different coatings. The gloss retention is the measured gloss as a percentage of the initial gloss (initial gloss set at 100%).

TABLE 4

Gloss retention results (in %; initial gloss set at 100%)

| Test time (h) | A1 | A2 | A3 | MIX 1 comp. | MIX 2 comp. | MIX 3 comp. |
|---|---|---|---|---|---|---|
| 0 | 100 | 100 | 100 | 100 | 100 | 100 |
| 1000 | 100.9 | 100.8 | 95 | 101.3 | 101 | 102.5 |
| 2000 | 97 | 96.6 | 88 | 101 | 98 | 101.6 |
| 3000 | 93 | 93 | — | 97.9 | 95 | 91 |
| 4000 | 82 | 86 | — | 99 | 90 | 90 |
| 5000 | — | — | — | 91 | 89 | — |

TABLE 5

Gloss retention results (in %; initial gloss set at 100%)

| Test time/h | A4 | A5 | A6 | A7 | MIX 8 inv. | MIX 9 inv. | MIX 10 comp. | MIX 11 comp. |
|---|---|---|---|---|---|---|---|---|
| 0 | 100 | 100 | 100 | 100 | 100 | 100 | 100 | 100 |
| 1000 | 99 | 91.5 | 100 | 94 | 103 | 108 | 105.3 | 102.5 |
| 2000 | 92 | 91 | 103.2 | 92 | 101 | 106 | 102.3 | 99.4 |

TABLE 5-continued

Gloss retention results (in %; initial gloss set at 100%)

| Test time/h | A4 | A5 | A6 | A7 | MIX 8 inv. | MIX 9 inv. | MIX 10 comp. | MIX 11 comp. |
|---|---|---|---|---|---|---|---|---|
| 3000 | 90 | 92 | 96.9 | 91 | 101 | 105 | 101.1 | 93 |
| 4000 | 86 | 89 | 84.5 | 89 | 100 | 104.6 | 99.8 | 92 |
| 5000 | — | — | — | — | 95 | 97 | 92.1 | 91 |

Example 3

Cured coatings prepared with MIX 8 and with MIX 9 were subjected to a series of tests according to standard test methods. The test results are shown in Table 6.

TABLE 6

Test results

| Test Items | Standard | Test Result |
|---|---|---|
| Dry film hardness | AAMA2605-05, 7.3 | PASS |
| Dry adhesion | AAMA2605-05, 7.4.1.1 | PASS |
|  | Qualicoat 14$^{th}$- Class 3, 2.4.1 |  |
| Wet adhesion | AAMA2605-05, 7.4.1.2 | PASS |
|  | Qualicoat 14$^{th}$- Class 3, 2.4.2 |  |
| Impact resistance | AAMA2605-05, 7.5 | PASS |
|  | Qualicoat 14$^{th}$- Class 3, 2.8 |  |
| Abrasion resistance | AAMA2605-05, 7.6 | PASS |
| Nitric acid resistance | AAMA2605-05, 7.7.3 | PASS |
| Detergent resistance | AAMA2605-05, 7.7.4 | PASS |
| Window cleaner resistance | AAMA2605-05, 7.7.5 | PASS |
| Humidity resistance | AAMA2605-05, 7.8.1 | PASS |
| Neutral salt spray resistance | AAMA2605-05, 7.8.2 | PASS |
| Acetic acid salt spray resistance | Qualicoat 14$^{th}$- Class 3, 2.10 | PASS |
| Mortar resistance | AAMA 2605-05, 7.7.2 | PASS |
|  | Qualicoat 14$^{th}$- Class 3, 2.15 |  |

The invention claimed is:

1. A hybrid polyester-fluorocarbon powder coating composition which is a dry blend of a polyester powder coating composition A and a fluorocarbon powder coating composition B, wherein:
polyester powder coating composition A comprises a first polyester polymer and a curing agent for the first polyester polymer; and
fluorocarbon powder coating composition B comprises a fluorocarbon polymer, a curing agent for the fluorocarbon polymer, and a second polyester polymer and a curing agent for the second polyester polymer;
wherein the weight ratio of polyester powder coating composition A and fluorocarbon powder coating composition B is in the range of from 25:75 to 75:25,
wherein the first polyester polymer is a carboxyl functional polymer having an acid value in the range from 18 to 70 mg KOH/g polymer and wherein the second polyester polymer is a hydroxyl functional polyester polymer having a hydroxyl value in the range of from 70 to 350 mg KOH/g polymer.

2. A hybrid polyester-fluorocarbon powder coating composition according to claim 1, wherein the second polyester polymer has a hydroxyl value in the range of from 75 to 150 mg KOH/g polymer.

3. A hybrid polyester-fluorocarbon powder coating composition according to claim 1, wherein the first polyester polymer is a carboxyl functional polymer having an acid value in the range from 20 to 55 mg KOH/g polymer.

4. A hybrid polyester-fluorocarbon powder coating composition according to claim 1, wherein the curing agent for the first polyester polymer is a glycidyl isocyanurate, or a beta-hydroxy alkyl amide.

5. A hybrid polyester-fluorocarbon powder coating composition according to claim 1, wherein polyester powder coating composition A comprises at least 30 wt % of the first polyester polymer.

6. A hybrid polyester-fluorocarbon powder coating composition according to claim 1, wherein fluorocarbon powder coating composition B comprises at least 30 wt % of the fluorocarbon polymer.

7. A hybrid polyester-fluorocarbon powder coating composition according to claim 1, wherein polyester powder coating composition A does not comprise a fluorocarbon polymer.

8. A hybrid polyester-fluorocarbon powder coating composition according to claim 1, wherein fluorocarbon powder coating composition B is essentially free of any film-forming polymer other than the fluorocarbon polymer and the second polyester polymer.

9. A hybrid polyester-fluorocarbon powder coating composition according to claim 1, wherein the weight ratio between the fluorocarbon polymer and second polyester polymer is in the range of from 0.5:1 to 4:1.

10. A hybrid polyester-fluorocarbon powder coating composition according to claim 1, wherein the curing agent for the fluorocarbon polymer is a diisocyanate-comprising compound.

11. A hybrid polyester-fluorocarbon powder coating composition according to claim 1, wherein the fluorocarbon powder coating composition B comprises a single curing agent which is the curing agent for the fluorocarbon polymer and the curing agent for the second polyester polymer.

12. A hybrid powder coating composition according to claim 1, wherein polyester powder coating composition A further comprises 0.1 to 15 wt % pigment providing a metallic effect, based on the weight of polyester powder coating composition A, wherein the pigment providing a metallic effect is bonded to polyester powder coating composition A.

13. A hybrid polyester-fluorocarbon powder coating composition according to claim 1, wherein the curing agent for the first polyester polymer is a triglycidylisocyanurate.

14. A hybrid polyester-fluorocarbon powder coating composition according to claim 1, wherein polyester powder coating composition A is essentially free of any film-forming polymer other than the first polyester polymer.

15. A hybrid polyester-fluorocarbon powder coating composition according to claim 1, wherein the curing agent for the fluorocarbon polymer is a blocked diisocyanate-comprising compound.

16. A method for coating a substrate comprising:
providing a substrate;
applying a hybrid powder coating composition according to any one of the preceding claims on the substrate; and
curing the hybrid powder coating composition applied on the substrate to obtain a coated substrate.

17. A method according to claim 16, wherein the substrate is a metal substrate, preferably an aluminium substrate.

18. A method according to claim 16, wherein the substrate is an aluminum substrate.

* * * * *